(12) United States Patent
Schumann et al.

(10) Patent No.: US 6,693,368 B2
(45) Date of Patent: Feb. 17, 2004

(54) POWER SUPPLY SYSTEM FOR A MOTOR VEHICLE HAVING A LOW-VOLTAGE ONBOARD POWER SUPPLY AND HAVING A HIGHER-VOLTAGE ONBOARD POWER SUPPLY

(75) Inventors: Anton Schumann, Munich (DE); Karl Kapfhammer, Germering (DE); Xaver Pfab, Isen (DE); Alfred Grom, Glonn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 367 days.

(21) Appl. No.: 09/877,246

(22) Filed: Jun. 11, 2001

(65) Prior Publication Data

US 2002/0050742 A1 May 2, 2002

(30) Foreign Application Priority Data

Jun. 10, 2000 (DE) .......................... 100 28 748

(51) Int. Cl.⁷ .................................................. B06L 1/00
(52) U.S. Cl. ...................................................... 307/10.1
(58) Field of Search .............................. 307/18, 19, 20, 307/21, 28, 10.1, 130; 320/103, 135, 136

(56) References Cited

U.S. PATENT DOCUMENTS

| | | | | |
|---|---|---|---|---|
| 3,818,128 A | * | 6/1974 | Chambers et al. ........... 348/730 |
| 4,233,558 A | * | 11/1980 | Gaertner ..................... 363/88 |
| 4,672,294 A | * | 6/1987 | Norton ....................... 320/123 |
| 5,164,655 A | * | 11/1992 | Heavey ....................... 322/8 |
| 5,335,133 A | * | 8/1994 | Bishop et al. ................. 361/56 |
| 6,229,279 B1 | * | 5/2001 | Dierker ....................... 320/104 |
| 6,275,001 B1 | * | 8/2001 | Dierker ....................... 320/103 |
| 6,600,239 B2 | * | 7/2003 | Winick et al. ................. 307/85 |

FOREIGN PATENT DOCUMENTS

| | | |
|---|---|---|
| DE | 44 35 726 A1 | 10/1994 |
| DE | 196 04 736 A1 | 2/1996 |
| DE | 4435726 | 4/1996 |
| DE | 197 10 073 A1 | 3/1997 |
| DE | 197 24 356 C1 | 6/1997 |
| DE | 197 55 050 A1 | 12/1997 |

OTHER PUBLICATIONS

Copy of German Search Report and translation of pertinent portions.

* cited by examiner

Primary Examiner—Gregory J. Toatley, Jr.
(74) Attorney, Agent, or Firm—Crowell & Moring LLP

(57) ABSTRACT

A power supply system for a motor vehicle has a low-voltage onboard power supply and a higher-voltage onboard power supply. Either the minus connection or the plus connection of at least the high-power consuming devices of the higher-voltage onboard power supply is coupled via a central bus line with the corresponding (minus or plus) connection of the low-voltage onboard power supply. The central bus line is provided with a controllable switch. Devices are provided for measuring the voltage of the low-voltage onboard power supply, and/or for measuring the differential current between the current flowing on the plus line and the current flowing on the minus line in the higher-voltage onboard power supply. The controllable switch is opened when the voltage in the low-voltage onboard power supply has exceeded a defined voltage threshold and/or when the differential current has exceeded a defined current threshold.

8 Claims, 3 Drawing Sheets

POWER SUPPLY SYSTEM FOR A MOTOR VEHICLE HAVING A LOW-VOLTAGE ONBOARD POWER SUPPLY AND HAVING A HIGHER-VOLTAGE ONBOARD POWER SUPPLY

BACKGROUND AND SUMMARY OF THE INVENTION

This application claims the priority of German patent document 100 28 748.4, filed Jun. 10, 2000, the disclosure of which is expressly incorporated by reference herein.

The invention relates to a power supply system for a motor vehicle having both a low-voltage onboard power supply and a higher-voltage onboard power supply.

A power supply system of this type is known, for example, from German Patent Document DE 197 24 356 C1. There, the voltage supply of 12 V or 14 V for low-voltage consuming devices corresponds to the low-voltage onboard power supply, and the voltage supply of 36 V or 42 V for high-power consuming devices corresponds to the higher-voltage onboard power supply. In such a power supply system, a generator normally generates the required voltage for the higher-voltage onboard power supply., while the voltage for the low-voltage onboard power supply is generated, for example, by a DC/DC converter. Particularly, the lighting and the electronic control equipment are powered by the low-voltage onboard power supply.

In such power supply systems (also called multivoltage onboard power supplies), a short circuit between the low-voltage onboard power supply and the higher-voltage onboard power supply would result in a rise of the voltage in the low-voltage onboard power supply such that the consuming devices of the low-voltage onboard power supply may be damaged or destroyed. It is also known that electromagnetically caused interferences occur to a higher degree in such multivoltage onboard power supplies.

It is therefore an object of the invention to provide a multivoltage onboard power supply with improved protection against short circuits and electromagnetic compatibility.

This and other objects and advantages are achieved by the power supply system according to the invention, in which it is checked, either by measuring the voltage at the low-voltage onboard power supply or by measuring the differential current in the high-voltage onboard power supply, whether a short circuit is occurring between the low-voltage power supply and the higher-voltage onboard power supply. And when a short circuit is detected, remedial measures are implemented to mitigate or eliminate the effects of the short circuit.

The term short circuit as used herein is understood to be a closed circuit, in that the voltage of the higher-voltage onboard power supply is applied to the consuming devices assigned to the low-voltage onboard power supply. For this type of short circuit, two couplings are required between the two onboard power supplies; first, a coupling of the plus connections and, secondly, a coupling of the minus connections of the two onboard power supplies.

In a first alternative, a short circuit is detected when the voltage of the low-voltage onboard power supply exceeds a value that is above the customary voltage value of the low-voltage onboard power supply. In a second alternative, a short circuit is detected when a differential current between the current flowing on the plus line and the current flowing on the minus line is present in the higher-voltage onboard power supply. The reason is that, in the no-fault normal case, the currents on the plus line and on the minus line are necessarily equal. Any deviation indicates a current which is flowing on a non-regular path and thus a possible line contact between the low-voltage onboard power supply and the high-voltage onboard power supply. In order to increase the reliability of the correct fault detection, the first and the second alternative may also be combined with one another.

An important aspect of the invention is also that the components of the higher-voltage onboard power supply either with respect to their minus connection or with respect to their plus connection are coupled by way of only one central bus line with the minus connection or with the plus connection of the low-voltage onboard power supply. This measure was found to be particularly advantageous with respect to the electromagnetic compatibility. Thus, with respect to one connection (preferably the minus connection), a first coupling between the low-voltage onboard power supply and the higher-voltage onboard power supply required for a short circuit is already provided intentionally. However, this does not result in a closed circuit such that the voltage of the higher-voltage onboard power supply is applied to the consuming devices of the low-voltage onboard power supply. For a (total) short circuit, a second coupling also has to be present between the respective other connections of the low-voltage onboard power supply and of the higher-voltage onboard power supply (that is, in the case of a preferably intentional coupling of the minus connections, also between the plus connections). Upon the occurrence of such a (total) short circuit as a result of a fault, according to the invention, the previously intentionally provided first coupling is separated by a controllable switch provided in the bus line. Thus, the effects of a short circuit can be effectively avoided.

As a result of the invention, on the one hand, the electromagnetic compatibility of a power supply system in the form of a multivoltage onboard power supply is increased and, on the other hand, the danger of the effects of a short circuit between the two onboard power supplies of different voltages is reduced.

In the case of such a multivoltage onboard power supply, the use of a DC/DC converter without potential separation is particularly advantageous, in the case of which DC/DC converter, the minus or ground connections of the different onboard power supplies are normally already interconnected anyhow. This coupling line of the minus or ground connections can simultaneously be used as a central bus line. However, according to the invention, the DC/DC converter must be modified with respect to the controllable switch in the bus line. This creates a particularly simple possibility for a central switch-off capacity in the event of a short circuit.

Other objects, advantages and novel features of the present invention will become apparent from the following detailed description of the invention when considered in conjunction with the accompanying drawings.

DETAILED DESCRIPTION OF THE DRAWINGS

Figure 1:
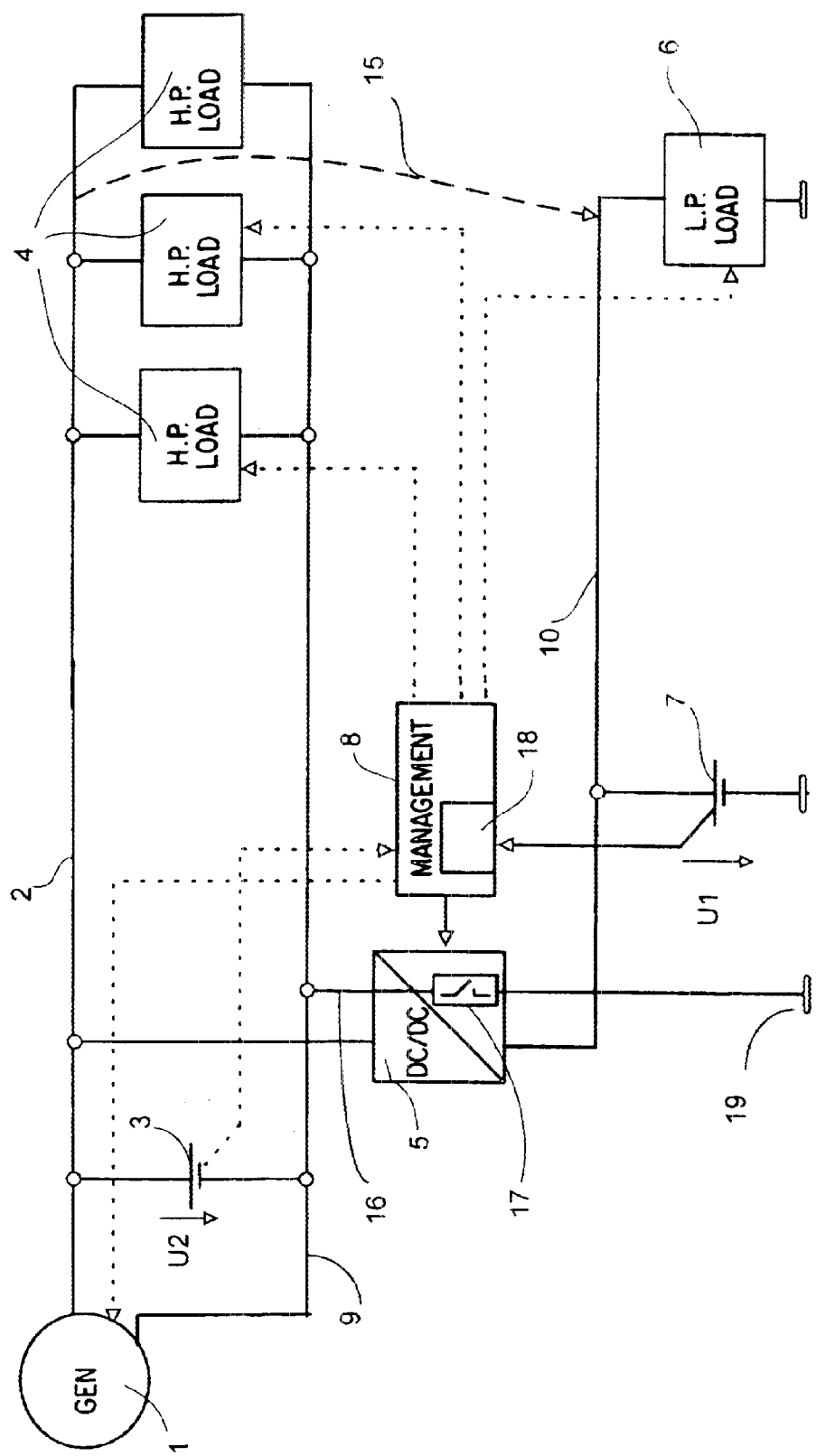
FIG. 1 is a view of a power supply system according to the invention with a voltage monitoring of the low-voltage onboard power supply for detecting the short circuit.

FIG. 1 illustrates a power supply system in the form of a two-voltage onboard power supply. The two-voltage onboard power supply consists of a low-voltage onboard power supply, for example, of 14 volt, and of a higher-voltage onboard power supply, for example, of 42 volt. The higher-voltage onboard power supply consists of a generator 1, an energy accumulator 3 and electrical high-power consuming devices 4, such as electromagnetic valve timing gear actuators. The generator 1 generates 42 volts, thereby supplying the high-power consuming devices 4. For buffering the electric energy, the energy accumulator 3, for example, is designed as a 36 volt battery. The minus connections of the components of the higher-voltage onboard power supply, particularly of the high-power consuming devices 4, are coupled with one another by way of the line 9. The plus connections of the components of the higher-voltage onboard power supply are coupled with one another by way of the line 2. The higher-voltage onboard power supply 1, 2, 3, 4, 9 is connected with the low-voltage onboard power supply by way of a DC/DC converter 5. The low-voltage onboard power supply consists particularly of an energy accumulator 7 and of low-power consuming devices 6, such as the vehicle lighting and the electronic control equipment. The energy accumulator 7 is, for example, a 12 volt battery.

The ground or minus connections of the components of the low-voltage onboard power supply can each be connected in a conventional manner with the vehicle mass. In contrast, the minus connections of the components 1, 3 and 4 of the higher-voltage onboard power supply are combined and are interconnected with the ground connection 19 by the DC/DC converter which has no potential separation here. The ground connection 19 is also assigned to the ground connections of the components 7, 6 of the low-voltage onboard power supply.

In the DC/DC converter 5, a controllable switch 17 is integrated by which the central bus line 16 can be interrupted as required. The DC/DC converter 5 can, for example, itself measure the voltage U1 of the low-voltage onboard power supply and, when a defined voltage threshold is exceeded, open the controllable switch 17.

However, as an alternative, a battery management control unit 18 can be provided which can be part of the low-voltage onboard power supply. Such a battery management control unit 18 monitors, for example, the battery condition, the voltage U1 and the temperature of the 12 volt battery 7 and defines to the DC/DC converter 5 the charging voltage suitable for the momentary condition as the desired value. The battery management control unit 18 can also monitor the voltage U1 and, when a defined voltage threshold is exceeded, transmits to the converter 5 a command for opening the controllable switch 17. In addition or as an alternative, an onboard management control unit 8 may be provided which monitors the respective utilization of the onboard power supply and, in the event of an extended charge balance deficit, takes measures against a threatening total battery discharge. Such an onboard management control unit 8 can also be used for detecting the rise of the voltage U1 in the low-voltage onboard power supply. The battery management control unit 18 may also be integrated in the onboard management control unit 8.

Figure 2:
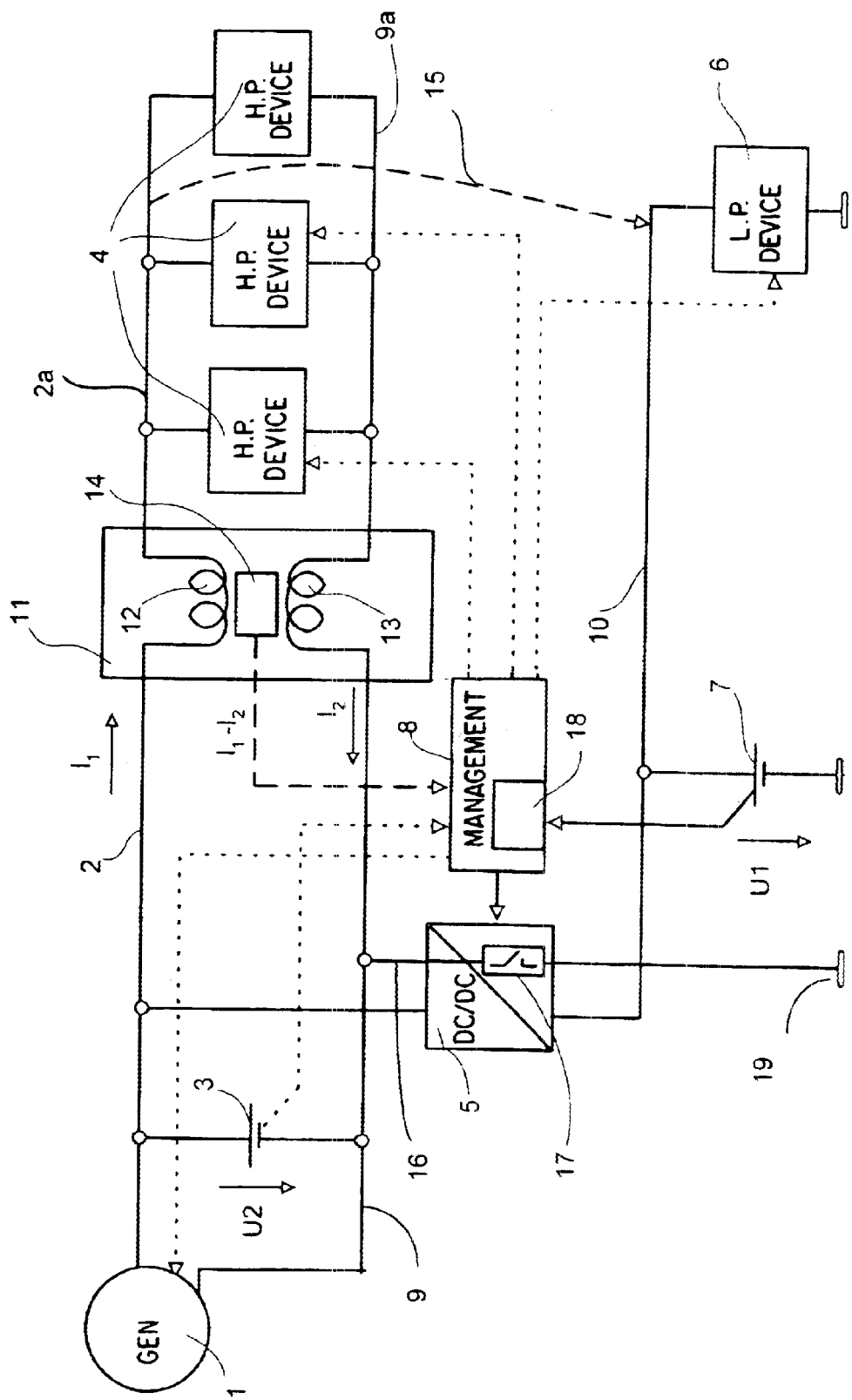
FIG. 2 is a view of the power supply system according to the invention with a differential current measurement in the higher-voltage onboard power supply for detecting the short circuit.

FIG. 2 illustrates a power supply system according to FIG. 1, expanded by a differential-current measuring system 11. Otherwise, identical parts are provided with the same reference numbers. In FIG. 2, according to the method known per se, the differential-current switch (also called F1), the current $I_1$ originating from the generator 1 and the battery 3 on the plus line 2 and 2a and the current $I_2$ returning to the generator 1 and the battery 3 on the minus line 9 and 9a are measured and compared with one another. In a normal case, the two current values $I_1$ and $I_2$ must be equal. If the measured differential current $(I_1-I_2)$ exceeds a defined current threshold, a short circuit is detected between the plus line 2 or 2a of the higher-voltage onboard power supply and the plus line 10 of the low-voltage onboard power supply. The differential-current measuring device 11 consists essentially of a coil situated on the "way there" in the plus line 2, of a coil 13 situated on the "way back" in the minus line 9 as well as of a measuring device 14. When the measuring device 14 detects that the differential current $(I_1-I_2)$ has exceeded a defined current threshold, it transmits a corresponding signal optionally by way of the control unit 8 or 18 to the DC/DC converter 5 which then opens the controllable switch 17.

Figure 4:
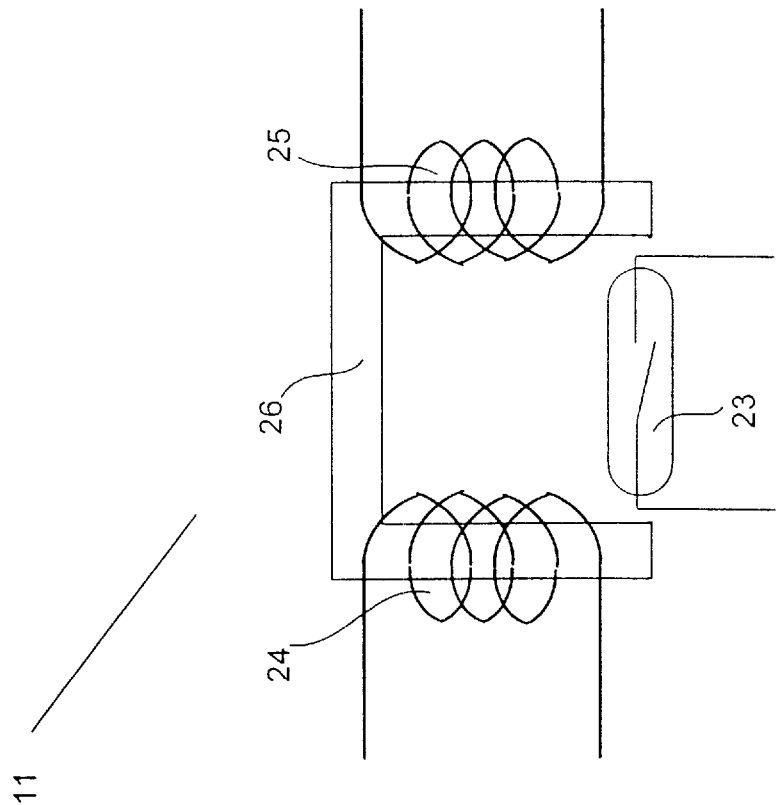
FIGS. 3 and 4 are views of possible embodiments of a system for measuring differential current.
Figure 3:
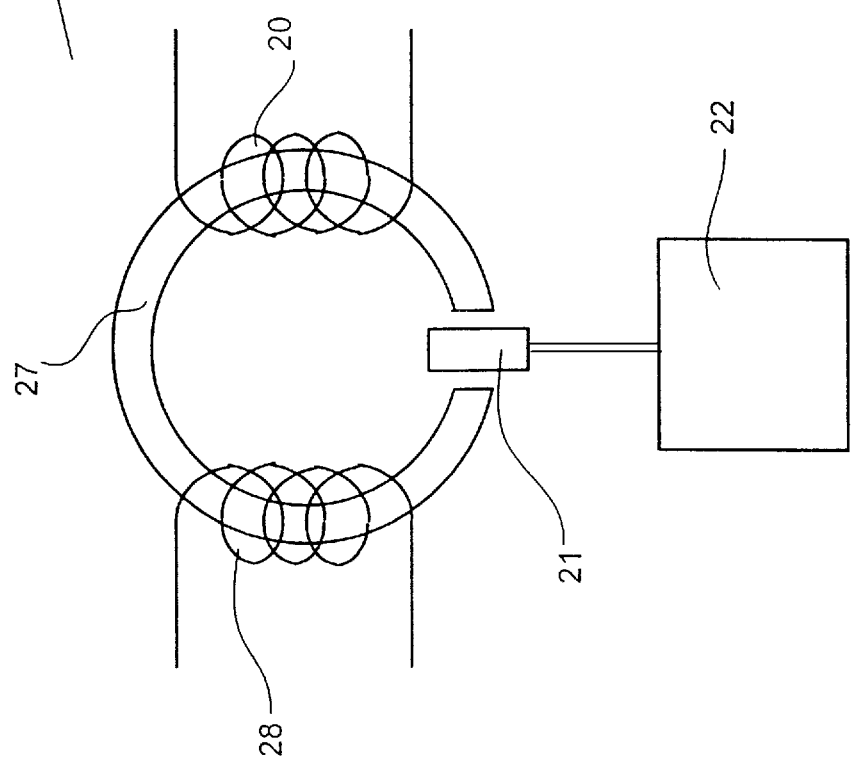

Details of possible differential current measuring systems 11 are illustrated in FIGS. 3 and 4 only in a supplementary manner. In FIG. 3, two coils 20 and 28 are utilized according to the known method which are wound onto an iron core 27 and through which the currents to be measured flow in opposite directions. As known from current sensors, the differential magnetic field forming in the iron core is measured by a magnetic-field sensor 21 (such has a Hall sensor or a magnetoresistive component) and is analyzed by an electronic unit 22; that is, compared with a defined desired value. As an alternative, a reed contact 23 is used in FIG. 4, which is surrounded by two coils 24 and 25 through which current flows in opposite directions. The Reed contact 23 switches when the differential magnetic field exceeds the response threshold of the Reed contact. In addition, an iron core 26 can be used for improving the magnetic flow. As soon as the magnetic-field sensor 21 according to FIG. 3 supplies a signal which is higher than an adjustable threshold value 21 or as soon as the Reed contact 23 switches according to FIG. 4, a conclusion is drawn that a contact 15 between lines (compare FIG. 2) has occurred.

It is important for the energy supply system according to the invention that the individual high-power consuming devices 4 of the higher-voltage onboard power supply are not, as customary in the case of low-voltage onboard power supplies, applied with one connection to the vehicle body mass. They must, on the contrary, have their own return wire in the form of the central bus line 16, which combines the minus connections and must be guided only by way of this central bus line in a central but separable manner to the ground potential 19.

A differential current which, because of a contact between the lines 15, has found its way into the low-voltage onboard power supply can be detected as such because it takes its "way back" not by way of the minus line 9 or 9a to the generator 1 or the battery 3, but flows through the consuming devices 6 of the low-voltage onboard power supply to the ground and thus bypasses the second measuring point at the coil 13.

Because the minus line 9a or 9 is connected with the ground potential 19 only by way of the line portion 16, any differential current can travel only along this path. It always has to pass through the line portion 16 and, according to the invention, can be switched off there by means of the controllable switch 17. Therefore, this single coupling to the ground is a significant characteristic of the invention.

As an alternative, the controllable switch 17 can also be provided outside the converter 5 in a separate apparatus.

However, an integration of the controllable switch in an apparatus which exists anyhow, such as the converter 5 or the control units 8 or 18, is preferable over a separate apparatus.

In a supplementary manner, it is pointed out that a contact between the plus line 2 of the higher-voltage onboard power supply and the vehicle mass 10 also results in a differential current by way of the path 19, 16, in which case, however, the consuming devices 6 of the low-voltage onboard power supply are bypassed. For this case, a protective device, such as a melting fuse, can result in a switching-off of the short circuit. Also an (additional) contact between the minus line 9 or 9a and the vehicle mass 19 can be detected by way of the differential current measuring device 11. Only a short circuit between the plus line 2 and the minus line 9 in the higher-voltage onboard power supply cannot be detected, for which, however, a melting fuse can also be provided as a protective element.

In addition, it is to be noted that a power supply system according to the invention will also exist, for example, when no converter 5, but for example two generators, (one for each onboard power supply) are provided. For space-saving reasons, for example, the minus connections or the plus connections of the two generators can be combined. In this case, the coupling line between the combined connections is to be constructed as a central bus line in which a controllable switch must be integrated.

It is an important feature of the invention that, for protecting the consuming devices of the low-pressure onboard power supply, intentional couplings between the different onboard power supplies can be separated in a controllable manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power supply system for a motor vehicle having a low-voltage onboard power supply and a higher-voltage onboard power supply, wherein:
   one of the minus connection and the plus connection of at least the high-power consuming devices of the higher-voltage onboard power supply is coupled via a central bus line with the corresponding minus or plus connection of the low-voltage onboard power supply;
   the central bus line has a controllable switch;
   devices are provided for measuring the voltage of the low-voltage onboard power supply; and
   the controllable switch is opened when the voltage of the low-voltage onboard power supply has exceeded a defined voltage threshold.

2. A power supply system for a motor vehicle having a low-voltage onboard power supply and a higher-voltage onboard power supply wherein:
   one of the minus connection and the plus connection of at least the high-power consuming devices of the higher-voltage onboard power supply is coupled via a central bus line with the corresponding minus or plus of the low-voltage onboard power supply;
   the central bus line has a controllable switch;
   devices are provided for measuring the differential current between the current flowing on the plus line and the current flowing on the minus line in the higher-voltage onboard power supply; and
   the controllable switch is opened when the differential current has exceeded a defined current threshold.

3. The power supply system according to claim 1, wherein:
   a DC/DC converter without potential separation is provided between the higher-voltage onboard power supply and the low-voltage onboard power supply; and
   an existing coupling between the minus connection of the high-voltage onboard power supply and the minus connection of the low-voltage onboard power supply in the DC/DC converter is used as the central bus line.

4. The power supply system according to claim 2, wherein:
   a DC/DC converter without potential separation is provided between the higher-voltage onboard power supply and the low-voltage onboard power supply; and
   an existing coupling between the minus connection of the high-voltage onboard power supply and the minus connection of the low-voltage onboard power supply in the DC/DC converter is used as the central bus line.

5. Method for supplying electric power to a motor vehicle by means of a power supply system according to claim 1.

6. A method of supplying power to a vehicle having a first set of high voltage power consuming devices and a second set of lower voltage power consuming devices, comprising:
   providing a higher-voltage onboard power supply coupled to provide electric power to the first set power consuming devices;
   providing a lower-voltage onboard power supply coupled to provide electric power to the second set of power consuming devices, with one of a minus connection and a plus connection of at least the first set of power consuming devices being coupled via a central bus line with the corresponding minus or plus connection of the low-voltage onboard power supply;
   providing a controllable switch in the central bus line;
   measuring the voltage of the low voltage onboard power supply;
   opening the controllable switch when the measured voltage exceeds a defined threshold value.

7. A method of supplying power to a vehicle having a first set of high voltage power consuming devices and a second set of lower voltage power consuming devices, comprising:
   providing a higher-voltage onboard power supply coupled to provide electric power to the first set power consuming devices;
   providing a lower-voltage onboard power supply coupled to provide electric power to the second set of power consuming devices, with one of a minus connection and a plus connection of at least the first set of power consuming devices being coupled via a central bus line with the corresponding minus or plus connection of the low-voltage onboard power supply;
   providing a controllable switch in the central bus line;
   measuring a differential between current flowing in a line of said bus that is connected to the plus connection and a line of said bus that is connected to the minus connection in the higher-voltage onboard power supply;
   opening the controllable switch when the differential exceeds a defined threshold value.

8. In a vehicle power supply system having a low-voltage onboard power supply connected to supply electric power to a set of low-voltage power consuming devices, a higher-voltage onboard power supply connected to supply electric power to a set of higher-voltage power consuming devices, and a central bus line connecting one of a plus connection and a minus connection of at least the higher-voltage power consuming devices with the corresponding plus or minus connection of the low-voltage on board power supply, protective apparatus comprising:

a controllable switch disposed in said central bus line;

devices for measuring at least one quantity selected from the group consisting of voltage of the low-voltage onboard power supply, and a difference between current flowing in a line of said bus that is connected to the plus connection and a line of said bus that is connected to the minus in the higher-voltage onboard power supply; and opening the controllable switch when a measured quantity exceeds a preset threshold.

* * * * *